Figure 1:
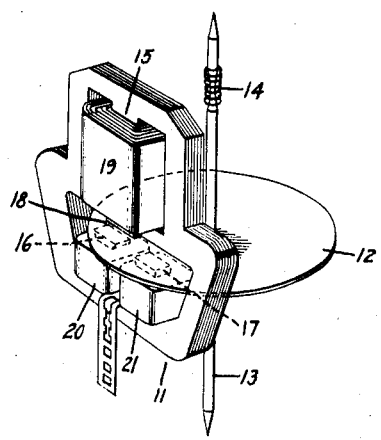

Dec. 14, 1943.  H. A. BAKKE  2,336,834
ADJUSTABLE COMPENSATING LAG COIL
Filed Sept. 11, 1942

Inventor:
Hans A. Bakke,
by Harry E. Dunham
His Attorney.

Patented Dec. 14, 1943

2,336,834

UNITED STATES PATENT OFFICE 2,336,834

ADJUSTABLE COMPENSATING LAG COIL

Hans A. Bakke, Swampscott, Mass., assignor to General Electric Company, a corporation of New York Application September 11, 1942, Serial No. 458,047

2 Claims. (Cl. 171—34)

My invention relates to unitary electrical coils or circuit elements and concerns particularly adjustable lag plates suitable for use in induction disk device such as watthour meters.

It is an object of my invention to provide an improved, sturdy, easily manufactured lag plate which may be arranged for temperature compensation and which maintains its adjustment.

Another object of my invention is to provide a construction suitable for use, either as a potential lag plate or a current flux lagging plate.

Other and further objects and advantages will become apparent as the description proceeds.

In induction devices such as watthour meters, for example, there are elements for producing magnetic fluxes representing potential and current respectively. For reasons to which more specific reference will be made hereinafter there is a tendency for the potential and current fluxes to depart from exact quadrature relationship necessary to represent truly the conditions when the current and potential are actually in phase, or the measured circuit has unity power factor. In order to bring about the proper flux relationship, it is customary to provide lag coils for lagging either the potential or current flux sufficiently to bring about the proper phase relationship. If only one lag coil is employed, it is applied to the potential flux. However, in some cases it is desirable to provide lag coils for both the current flux and the potential flux. For example, Patent No. 1,764,339, Oman, describes a watthour meter designed to have compensation against variations in effects of temperature at all power factors in which both a potential lag coil and a current lag coil are employed. Patent No. 2,050,881, Faus, discloses a watthour meter in which only the potential flux is lagged. In this case a lag plate is shown which may be used alone or in conjunction with separate lag and light load plates for adjusting the lag and the light load torque. A magnetic circuit is provided which is in inductive relation to the inductive circuit of the lag plate and has a negative coefficient of permeability to provide temperature compensation of the class of temperature errors of a watthour meter which tend to vary with power factor.

In carrying out my invention in its preferred form I provide a lag plate which may be formed from sheet material which also has the advantage of providing temperature compensation but which is adjustable by variation of its resistance. The lag plate described in the present application may be used in conjunction with a separate movable lag plate if desired. In order to permit adjustment of the resistance of my lag plate I form the plate of such a configuration that there is an extending U-shaped or hairpin-shaped portion or tongue, the resistance and electrical length of which may be varied.

A better understanding of the invention will be afforded by the following detailed description considered in connection with the accompanying drawing, and those features of the invention which are believed to be novel and patentable will be pointed out in the claims appended hereto.

Figure 2:
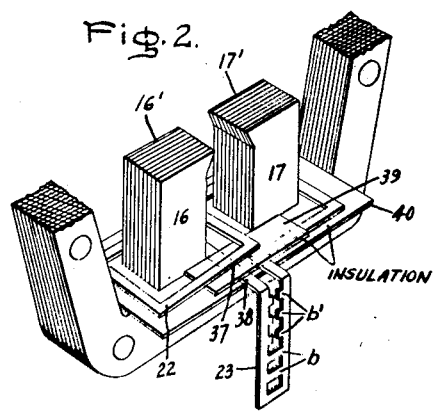
Figure 3:
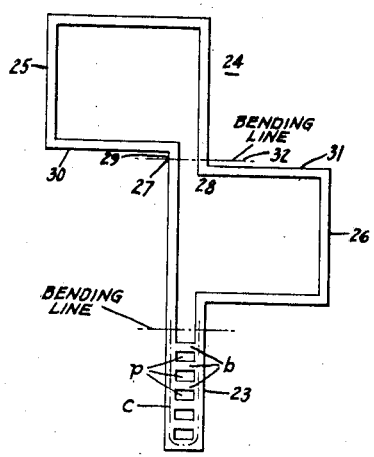
Figure 4:
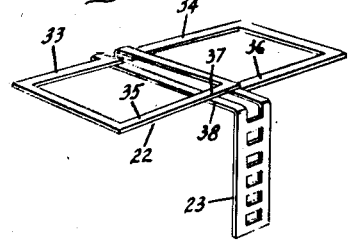

In the drawing Fig. 1 is a perspective view of the operating mechanism of a watthour meter or similar device; Fig. 2 is a perspective fragmentary view of the magnetic field structure of the apparatus of Fig. 1 showing the lower portion of the field structure including the current cores and showing a lag plate for the current flux; Fig. 3 is a development of the lag plate shown in the apparatus of Fig. 2 and showing the shape of the blank from which the plate is formed, and Fig. 4 is a perspective view of the lag plate represented in Figs. 1 to 3. Like reference characters are used throughout the drawing to designate like parts.

The lag plate disclosed herein will be described as used in connection with a watthour meter since watthour meters are the principal commercial devices of the type which may be referred to as induction disk devices in which there is a field structure producing two magnetic fields displaced in time and space phase and acting upon a rotor which ordinarily takes the form of an induction disk. The invention is applicable to other types of such devices such as reactive voltampere watthour meters, induction type wattmeters, power relays and the like.

As illustrated in Fig. 1 there is a magnetic field structure 11 having an air gap therein to receive a rotatably mounted induction disk 12. The induction disk 12 is composed of electrically conducting material such as aluminum or copper and is carried by a rotatably mounted spindle 13, the bearings of which are not shown. In the case of integrating devices such as watthour meters the spindle is provided with a suitable device such as a worm thread 14 to engage mechanism (not shown) to drive a watthour meter register (not shown).

The field structure 11 includes an electromagnet core 15 and, as shown more clearly in Fig. 2, a pair of electromagnet cores 16 and 17. The inner ends of the magnet cores 15, 16 and 17 form pole faces lying along spaced planes to form an air gap 18 to receive the disk 12. The inner ends of the magnet cores are not actually visible in Fig. 1 but the inner ends of the magnet cores 16 and 17 forming the pole faces 16' and 17' are shown in the fragmentary view of Fig. 2. Suitable yoke members are provided in the field structure 11 to form magnetic return paths from the outer ends of the magnet cores 15, 16 and 17 to the air gap 18. In the arrangement illustrated the magnet cores 15, 16 and 17 are united to the magnetic material forming the magnetic return paths to form an integral structure, preferably consisting of stacked laminations. However, the magnet core 15 need not necessarily be integral with the magnet cores 16 and 17.

For convenience the magnet core 15 will be referred to as a potential core and the cores 16 and 17 as current cores since in watthour meters it is common practice to wind a voltage or potential coil 19 (Fig. 1) on the single core 15 to form a voltage electromagnet and to wind a pair of coils 20 and 21 on the pair of magnet cores 16 and 17 to form a pair of current electromagnets.

For convenience in distinguishing electromagnets in the description and claims the terms "potential and current magnets" and "potential and current coils" will be employed. It will be understood, however, that my invention is not limited to watthour meters or to apparatus in which a voltage responsive coil is mounted on the magnet core 15 and current responsive coils are mounted on the magnet cores 16 and 17.

It will be seen from the drawing that the magnets 16 and 17 are out of line with the magnet 15 and therefore the pole faces are displaced to provide displacement in the space phase of the fluxes produced by the electromagnets represented by the cores 15, 16 and 17. Suitable means are provided to bring about the quadrature relationship (for unity power factor of the circuit measured) in the time phase between the fluxes of the potential pole and the current poles. In the case of the watthour meter this comes about because the potential coil 19 consists of a large number of turns and is therefore highly inductive so that the current drawn thereby is approximately in quadrature with the applied voltage. The current coils 20 and 21 are connected in series with the line so that the fluxes are in phase with line current. Owing to resistance losses and other causes, however, the exact quadrature (for unity power factor of the line) is not obtained between the potential and current fluxes unless a lag coil or lag plate is employed. Such a lag coil must be adjusted to provide the requisite degree of lagging to bring the potential and current fluxes in exact quadrature.

If only one lag coil is provided, it is mounted to link the potential flux; for example, it may be mounted in the air gap 18 and be of such size as to span the pole face of the potential core 15. A lag coil or plate to link the current flux is preferably arranged as a figure 8 and, as shown in Fig. 2 it may, if desired, be mounted at the lower ends of the current cores 16 and 17 close to the yoke portion of the field structure.

In order to adjust the amount of lagging produced by the lag plate, I provide a lag plate 22 which has a projecting portion 23, the resistance of which may be adjusted. The lag plate is composed of suitable electrically conducting sheet material such as copper, for example, which has been stamped with the inside cut out to leave an opening. Therefore the plate forms a closed flat electrical loop. Adjustment of the resistance of the closed electrical circuit of the lag plate provides adjustment of the current flowing therein which is induced by the flux linking the lag plate and therefore provides adjustment of the amount of lagging of such flux.

In the case of a current flux lagging plate, in order to form a figure 8 shape of loop and the projecting adjustable resistance projecting portion or tongue 23, I utilize a blank 24 of the shape shown in Fig. 3. It will be seen that the blank 24 has an outline which may best be described as consisting of two rectangles 25 and 26 offset and joined at adjacent corners 27 and 28 with a sufficient joint portion 29 so that the nearest edges 30 and 31 of the rectangles 25 and 26 are spaced apart. This spacing facilitates forming of the figure 8 in a manner which will be explained hereinafter. The interior portions of the rectangles 25 and 26 and of the joining portion 29 are removed so as to leave only the margins of the stamping 24 forming a large opening surrounded by the closed electrical circuit member composed of flat strip material. One of the rectangles, for example, the rectangle 26, has the extending portion or tongue 23.

The tongue 23 is so designed that the principal electrical circuit is divided into two parts so as to have substantially a U-shape or hairpin-shape. The tongue 23 is provided with a plurality of perforations $p$ along the center line of the tongue 23, thus leaving an uninterrupted U-shape electrical current path $c$. The path $c$ is, however, short circuited or bridged by the connecting portions or cross-ribs of metal $b$ between adjacent perforations $p$. For adjustment of the resistance of the circuit path $c$ of the tongue 23 the requisite number of cross-ribs $b$ are filed, cut, or otherwise severed to eliminate as many of the short-circuiting paths required to produce a requisite resistance. As illustrated in Fig. 2 the connecting portions or cross-ribs which have been cut are designated by the letter $b'$ and the cross-ribs which have not been cut are designated by the letter $b$. If it is desired to reduce the resistance of the lag plate again after the connections $b'$ have been cut, one of them can be rejoined completely or partially by soldering or brazing. The resistance of the lag plate may be closely adjusted by sawing along the center line of the tongue 23, starting at the inner end and cutting toward the outer end, without necessarily completely severing one of the cross ribs $b$. The tongue 23 may also be made solid without any perforations and cross-ribs, the resistance being adjusted by the length of cut as just explained.

The blank 24 of Fig. 3 is formed into a figure 8 loop by folding the rectangle 25 around a bending line 32 so as to overlap partially the rectangle 26. The bending line 32 is across the middle of the joining portion 29 of the blank 24. Consequently in the folded figure 8 as shown in Fig. 4 the loop edges or strip portions 33 and 34 are in alignment; likewise the opposite strip portions 35 and 36, assuming that the rectangles 25 and 26 have been formed with the same width. If desired the resistance adjusting tongue 23 may be bent over, for example, at right angles as illustrated in Figs. 1, 2 and 4 for the sake of greater compactness of the completed watthour meter.

To guard against the possibility of short circuit between the portion 37 and the portions 38 and 36 (Fig. 4), an insulating strip of suitable composition such as a fiber insulating strip 39, for example (Fig. 2) may be placed under the portion 37 of the lag plate. As a further precaution to guard against electrical short circuiting of the lag plate 22 by the magnetic material of the field structure, a large three-legged sheet of insulation 40 may be placed over the magnet poles 16 and 17 before the lag plate 22 is mounted in place, thus providing an insulating rest under the lag plate 22. It will be understood that the current coils 20 and 21 surround the cores 16 and 17 respectively, resting upon the lag plate 22. Such current coils are, however, customarily wrapped with insulation so that separate insulation between the current coils and the lag plate 22 will ordinarily not be required.

To form a potential flux lag plate in accordance with my invention the rectangular portion 25 of the blank 24 may be omitted with the rectangular portion 26 left closed along the top edge 31. In this case no folding operation is required. It will be understood that ordinarily greater lagging of the potential flux is required than is required of the current flux. Consequently in the ordinary design of watthour meters a figure 8 current flux lag plate such as illustrated in Fig. 4 will ordinarily not be employed except in conjunction with a potential flux lag plate. For obtaining temperature compensation as explained in the aforesaid Oman patent the flux lag plate may be composed of a material such as brass having a smaller temperature coefficient of resistance than the current flux lag plate which may be composed of a material such as copper. Adjustment of resistance in accordance with my invention by means of tongues having removable cross-ribs may be provided in both the potential and current flux lag plates to provide a design of maximum flexibility. However, with suitable designs such resistance adjustment need be provided for only one or the other of the lag plates.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A lag plate for an induction disk device comprising a sheet of electrically conducting material with an opening therein to form a closed electrical loop with an extending portion provided with a plurality of perforations extending along a line longitudinal of said extending portion and thus forming cross-ribs between the perforations adapted to be severed for varying the electrical circuit resistance of the loop.

2. A lag plate for an induction disk device comprising a bent sheet of electrically conducting material formed from a blank in the shape of a pair of diagonally and laterally offset rectangles joined at one of their corners with edges parallel and a tongue extending from one of the rectangles, such blank having an opening therein approaching the margins thereof and continuing from the interior of one rectangle to the interior of the other through the portion of the blank joining the rectangles to form a closed flat strip loop, the lag plate being in the shape produced by folding over such blank along a line parallel to adjacent edges of the rectangles through the portion of the blank joining the rectangles to form a figure 8 loop, the extending tongue having a plurality of perforations extending along a line longitudinal thereof and thus forming cross-ribs between the perforations adapted to be severed for varying the electric circuit resistance of the loop.

HANS A. BAKKE.